United States Patent
Wuerthinger et al.

(10) Patent No.: US 9,235,433 B2
(45) Date of Patent: Jan. 12, 2016

(54) SPECULATIVE OBJECT REPRESENTATION

(71) Applicant: Oracle International Corporation, Redwood Shores, CA (US)

(72) Inventors: Thomas Wuerthinger, Utzenaich (AT); Lukas Stadler, Oberkappel (AT)

(73) Assignee: Oracle International Corporation, Redwood Shores, CA (US)

( * ) Notice: Subject to any disclaimer, the term of this patent is extended or adjusted under 35 U.S.C. 154(b) by 92 days.

(21) Appl. No.: 14/061,677

(22) Filed: Oct. 23, 2013

(65) Prior Publication Data

US 2015/0113512 A1 Apr. 23, 2015

(51) Int. Cl.
 G06F 9/45 (2006.01)
 G06F 9/455 (2006.01)
(52) U.S. Cl.
 CPC .......... *G06F 9/45508* (2013.01); *G06F 8/41* (2013.01); *G06F 8/433* (2013.01); *G06F 8/443* (2013.01); *G06F 9/4552* (2013.01)
(58) Field of Classification Search
 IPC ............... G06F 9/06,12/0875, 8/443, 9/3802, G06F 9/3818, 9/45508; F06F 9/30072, 9/30079, F06F 11/1407
 See application file for complete search history.

(56) References Cited

U.S. PATENT DOCUMENTS

| 5,933,635 | A | 8/1999 | Holzle et al. |
| 6,518,979 | B1 | 2/2003 | Spertus et al. |
| 2006/0036809 | A1* | 2/2006 | Rudd ............................. 711/125 |
| 2011/0119526 | A1* | 5/2011 | Blumrich et al. ............... 714/16 |
| 2013/0061128 | A1* | 3/2013 | Lucco et al. ................... 715/234 |
| 2014/0082329 | A1* | 3/2014 | Ghose ............................ 712/208 |
| 2014/0325492 | A1* | 10/2014 | Stoodley et al. ............... 717/148 |
| 2015/0007151 | A1* | 1/2015 | Wuerthinger ......... G06F 9/4552 717/144 |

OTHER PUBLICATIONS

Fay Chang, "Using Speculative Execution to Automatically Hide I/O Latency" Dec. 2001, Carnegie Mellon Univ. 188 pg, <Chang_01.pdf>.*

Consel, C., Pu, C., Walpole, J., "Incremental Partial Evaluation: The key to High Performance, Modularity and Portability in Operating Systems," In Proceddigns of the Symposium on Partial Evaluation and Semantics-Based Program Manipulation, Jan. 1993, 3 pages.

(Continued)

*Primary Examiner* — Tuan Vu

(74) *Attorney, Agent, or Firm* — Osha • Liang LLP

(57) ABSTRACT

A method for optimizing code includes receiving, by a compiler and from an interpreter, a code section representation including an object allocation, compiling, by the compiler, the code section representation into machine code with a compact allocated object of the object allocation, and triggering a deoptimization returning execution to the interpreter in response to an attempted access of the compact allocated object. The method further includes setting, by the interpreter and within the code section representation, a flag indicating that a new compact allocated object is required at a location of the attempted access, receiving, by the compiler, the code section representation including the flag, compiling, by the compiler and according to the flag, the code section representation into new machine code including the new compact allocated object, and executing the new machine code with the new compact allocated object.

17 Claims, 6 Drawing Sheets

(56) References Cited

OTHER PUBLICATIONS

Deutsch, L., Schiffman, A., "Efficient !implementation of the Smalltalk-80 System", Proceeding POPL '84 Proceedings of the 11th ACM SIGACT-SIGPLAN symposium on Principles of programming languages, Jan. 1, 1984, 6 pages.

da Silva, A., Costa, V., "An Experimental Evaluation of JAVA JIT Technology", Journal of Universal Computer Science, vol. 1, No. 7, Jul. 28, 2005, 19 pages.

\* cited by examiner

Pseudo Code
300

```
Class Foo {
        int x;
        int y;
} int bar() {
1:      Foo obj = new Foo();
2:      obj.x = 5;
3:      baz(obj);
4:      obj.x = obj.x +2;
5:      baz(obj);
6:      return obj.x;
}
```

FIG. 3

SPECULATIVE OBJECT REPRESENTATION

CROSS-REFERENCE TO RELATED APPLICATIONS

The present application contains subject matter that may be related to the subject matter in U.S. patent application Ser. No. 13/731,698, filed on Dec. 31, 2012, entitled "SELF-OPTIMIZING INTERPRETER AND SNAPSHOT COMPILATION," and U.S. patent application Ser. No. 13/931,475, filed on Jun. 28, 2013, entitled "SPECULATIVE OBJECT SHAPES," which are both assigned to a common assignee and are incorporated by reference in their entirety.

BACKGROUND

In general, programmers seek the most efficient way to execute their code, whether the code is executed using an interpreter, compiler, or both. An interpreter is a program that is capable of executing source code. A compiler transforms the source code into another form, such as machine code, which is then executed. When the code is transformed, an interpreter is often not required for execution. Each choice has advantages and disadvantages.

SUMMARY OF INVENTION

In general, in one or more aspects, the invention relates to a method for optimizing code. A method for optimizing code includes receiving, by a compiler and from an interpreter, a code section representation including an object allocation, compiling, by the compiler, the code section representation into machine code with a compact allocated object of the object allocation, and triggering a deoptimization returning execution to the interpreter in response to an attempted access of the compact allocated object. The method further includes setting, within the code section representation, a flag indicating that a new compact allocated object is required at a location of the attempted access, receiving, by the compiler, the code section representation including the flag, compiling, by the compiler and according to the flag, the code section representation into new machine code including the new compact allocated object, and executing the new machine code with the new compact allocated object.

In general, in one or more aspects, the invention relates to a non-transitory computer-readable medium (CRM) storing instructions for optimizing code. The instructions include functionality to receive, by a compiler and from an interpreter, a code section representation including an object allocation, compile, by the compiler, the code section representation into machine code including a compact allocated object of the object allocation, and trigger a deoptimization returning execution to the interpreter in response to an attempted access of the compact allocated object. The instructions include further functionality to receive, by the compiler, the code section representation comprising a flag indicating that the object allocation requires a new compact allocated object and, compile, by the compiler and according to the flag, the code section representation into new machine code including the new compact allocated object.

In general, in one or more aspects, the invention relates to a system for optimizing code. The system includes a processor and memory including a compiler executing on the processor and configured to receive a code section representation including an object allocation, compile the code section representation into machine code including a compact allocated object of the object allocation, trigger a deoptimization returning execution to an interpreter in response to an attempted access of the compact allocated object, receive the code section representation including a flag indicating that the object allocation requires a new compact allocated object, and compile, according to the flag, the code section representation into new machine code to generate the new compact allocated object.

Other aspects and advantages of the invention will be apparent from the following description and the appended claims.

BRIEF DESCRIPTION OF DRAWINGS

FIG. 3 shows an example in accordance with one or more embodiments of the invention.

DETAILED DESCRIPTION

Figure 1A:
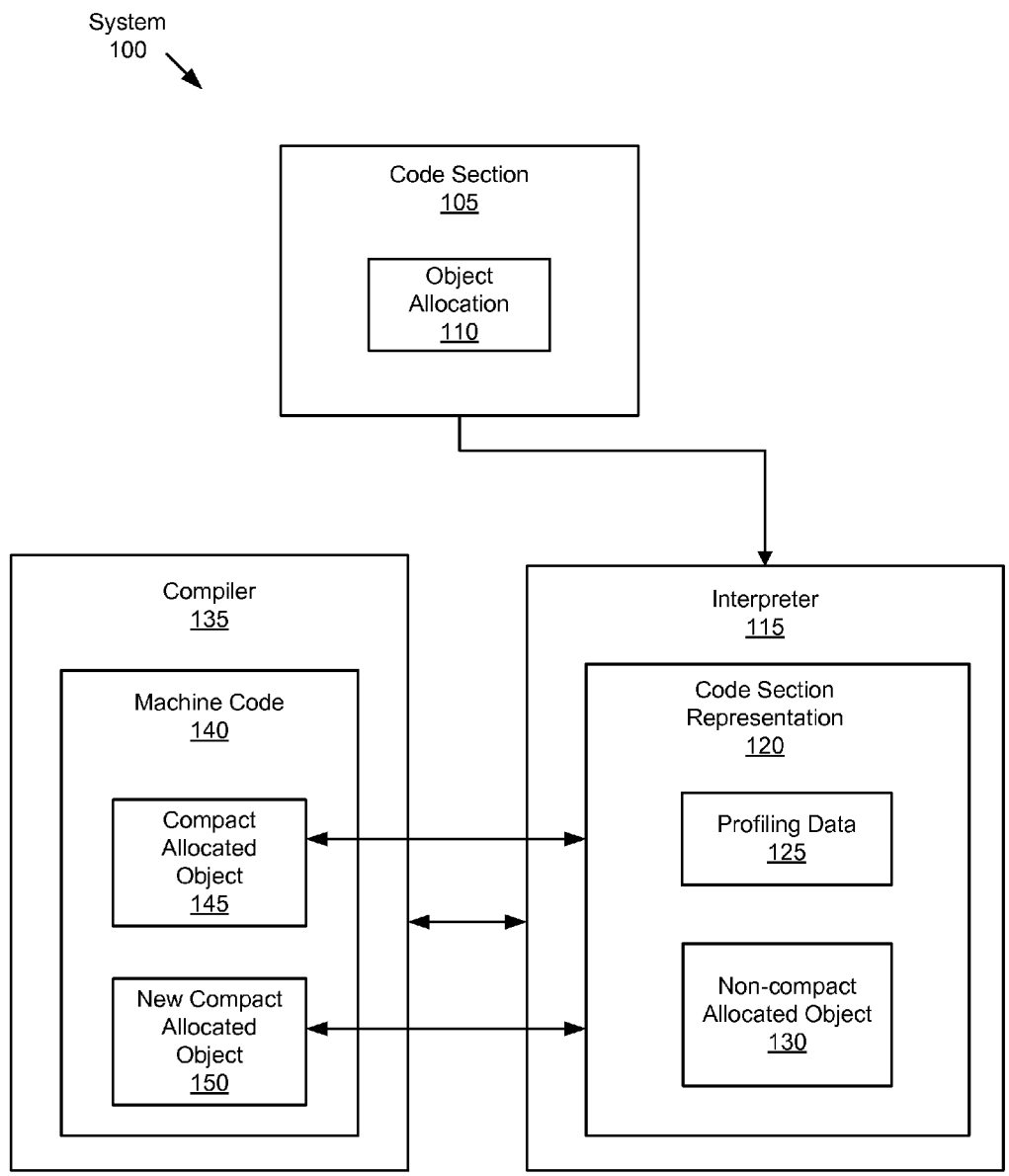
FIGS. 1A and 1B show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for optimizing code. A code section representation with an allocation of an object is received at a compiler, which compiles the code section representation into machine code. The machine code includes a compact allocated object of the object allocation. In one or more embodiments of the invention, the compact allocated object is initially in an inaccessible form based on a speculation that the compact allocated object will not be accessed. When the machine code is subsequently executed, an attempted access of the compact allocated object triggers a deoptimization out of the machine code, returning execution to the interpreter. A flag is set on access of the allocated object, indicating that a different representation is required for the allocated object. The compiler then receives the code section representation with the flag, and compiles the code section representation into new machine code, where the allocated object is represented as a new compact allocated object. The new machine code may then execute. Throughout this specification the term "compact allocated object" may be used to refer to the representation of an object in memory that is optimized in comparison to the "normal" or non-compact representation of an object. For example, a compact allocated object may not include all the fields and values of the object, thus reducing the space (i.e., the amount of memory) used by the compact allocated object. Typically, this representation is more compact than a "normal" representation, but that is not always the case. Additionally, the terms compact and optimized may be used interchangeably.

FIG. 1A shows a system (100), which includes a code section (105), an object allocation (110), an interpreter (115), a code section representation (120), profiling data (125), a non-compact allocated object (130), a compiler (135), machine code (140), an compact allocated object (145), and a new compact allocated object (150). In one or more embodiments of the invention, the code section (105) is a source code file, or portion thereof, that will be executed. The code section (105) may be in any programming language now known or later developed. In one or more embodiments of the invention, the code section (105) may include multiple files and/or multiple programming languages, and may be of any size. Alternatively, the code section (105) may include a single file in a single programming language. It will be apparent to one of ordinary skill in the art, having the benefit of this disclosure, that the code section (105) may be configured in many different ways and, as such, should not be limited to the above examples. The code section (105) includes at least one object allocation (110).

In one or more embodiments of the invention, an object allocation (110) is a portion of code section (105) that creates an object. An object may be a data structure, variable, or function as identified by code section (105). There may be any number of object allocations (110) and, thus, objects, in the code section (105), from one to millions or more. Generally, an object is a value in a location in memory referenced by an identifier, such as a pointer. When code containing an object allocation is executed, the object is "created" and stored in memory as an allocated object. In one or more embodiments of the invention, an allocated object may be represented in many different forms dependent on the locality and type of access of the allocated object, as discussed below.

The type of access of the allocated object refers to a read access or a write access of a given allocated object. A read access merely requires the ability to access the data of the given allocated object, and read the content(s). A write access requires the ability to change the contents of the allocated object. A write access may be a more costly operation than a read access in accordance with one or more embodiments of the invention.

The locality of access of an allocated object refers to the context from which the allocated object is accessed. For example, consider three potential localities of an allocated object: (i) an allocated object may be local to the current compilation scope (i.e., current subroutine and (parts of) other subroutines included by the compiler due to inlining, etc.), with no escaping references (i.e., allocated objects that are accessed from outside of the current compilation scope); (ii) an allocated object may escape to called methods, from which the allocated object recursively escapes to called methods; and (iii) an allocated object escapes into a globally accessible state (i.e., to another thread of execution, into a global data structure, etc.). The effect of (ii) is that the given allocated object may only be accessed from outside the current compilation scope while these called methods are active. It will be apparent to one of ordinary skill in the art, having the benefit of this disclosure, that there may be many different granularities of locality and, as such, the invention should not be limited to the above examples.

In one or more embodiments of the invention, an interpreter (115) is any kind of interpreter for any programming language now known or later developed. The interpreter (115) includes functionality to translate code section (105) into an intermediate representation (i.e., code section representation (120)) and execute the intermediate representation. Alternatively, the interpreter (115) includes functionality to directly execute the code section (105), or may execute previously compiled code. Further still, the interpreter (115) includes functionality to execute code using some combination of the above methods, and/or any other method now known or later developed.

In one or more embodiments of the invention, the code section representation (120) is generated by the interpreter (115). Alternatively, the code section representation (120) may be generated by any other suitable component or module. The code section representation (120) may take many different forms including, but not limited to: abstract syntax trees (AST), graphs, flows, and/or any other suitable form. In one or more embodiments of the invention, the interpreter (115) is self-optimizing and able to dynamically change aspects of the code section representation (120). In other words, self-optimizing means that the interpreter (115) is able to improve the execution of the code section representation (120) at runtime.

In one or more embodiments of the invention, the interpreter (115) works in conjunction with compiler (135). The compiler (135) may create optimized machine code, and when a speculation or other optimization is proven incorrect, the machine code is able to be deoptimized and execution may return to the interpreter (115). For example, rather than allocating the fields of an allocated object, the system may speculate that an allocated object will not be accessed during execution of a given method (from within or outside of the given method), and is therefore able to use local variables, rather than global variables. If the speculation is incorrect, the interpreter (115) and the compiler (135) are able to return execution to the state in which the execution was in prior to the speculation, and continue executing as though the mistaken speculation never occurred. In one or more embodiments of the invention, the code section representation (120) includes profiling data (125) and a non-compact allocated object (130).

In one or more embodiments of the invention, profiling data (125) are metrics gathered during execution of the code (i.e., at runtime). Profiling data (125) may include, but is not limited to: the number of times a unit of code (e.g., a node, a loop, a method, etc.) has been executed, how recently code section representation (120) (or a portion thereof) has been dynamically changed, the actual values, value ranges, and/or types of inputs given to an operation at runtime, the expected type or scope of access of an allocated object, etc. In one or more embodiments of the invention, profiling data (125) may be used to aid in speculating on the type of access of an allocated object and the locality of access of an allocated object.

In one or more embodiments of the invention, a non-compact allocated object (130) is a native representation of an allocated object in memory that is not optimized. The non-compact allocated object (130) is the least efficient of the available representation forms for allocated objects. The different allocated object representations available to the system are discussed in more detail in FIG. 1B.

Figure 1B:
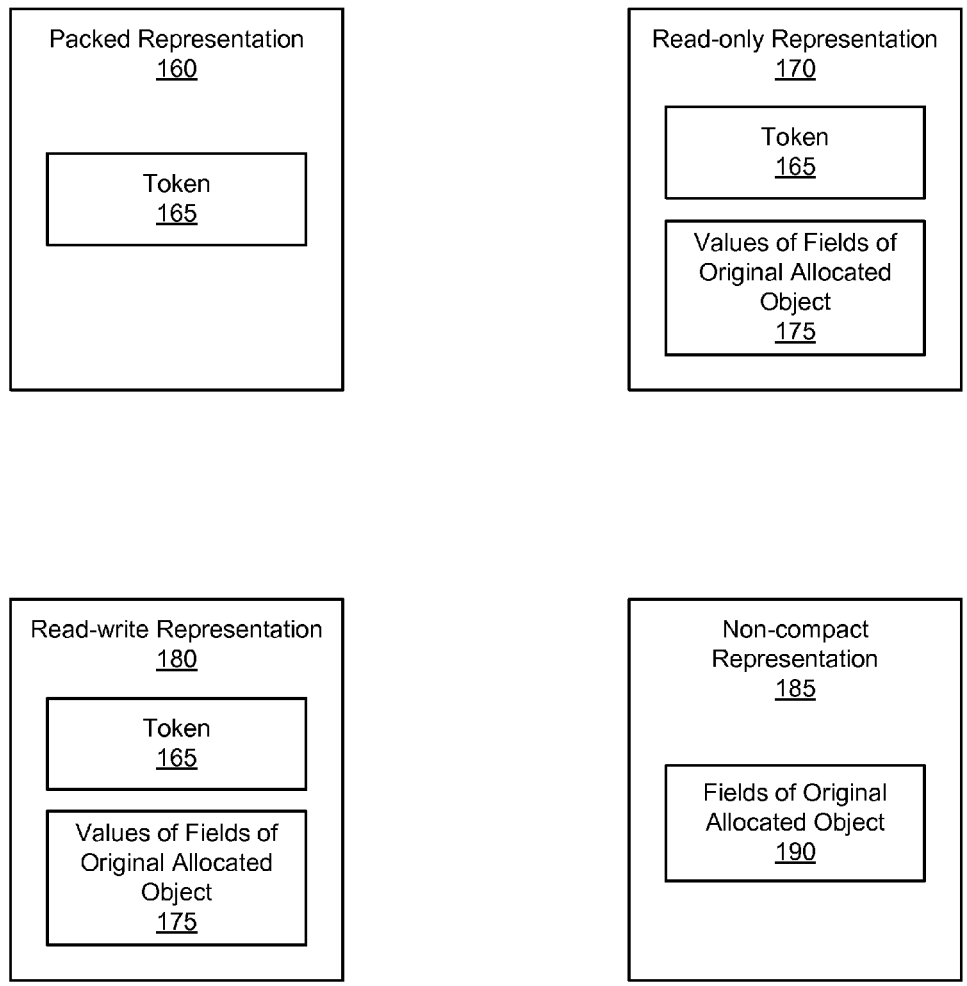

Turning to FIG. 1B, a packed representation (160) is a representation of the allocated object that is the most restrictive representation, occupying the least amount of space in memory. Specifically, the packed representation (160) is inaccessible by any function or method, and includes only a token (165). By making the packed representation (160) inaccessible, the system is able to use escape analysis to determine that the given allocated object is local, remove the allocation, and use local variables (i.e., perform scalar replacement). The token (165) includes information needed by the system for finding the activation of the compilation that the given packed representation originated from (such as locations within the code section representation or other suitable location) and, within this compilation, the allocation site that was speculatively removed. The token (165) further includes the information necessary for a deoptimization to occur. Further, the information within the token (165), along with the current state of the thread of execution in which the deoptimization occurs and (where applicable) the values of fields of original allocated object (175), is enough to reconstruct the contents of the other representations (i.e., the read-only representation (170), the read-write representation (180), and the non-compact representation (185)).

In one or more embodiments of the invention, a read-only representation (170) includes the token (165), and the values of fields of original allocated object (175). The read-only representation (170) includes the values of the original allocated object, but the values may not be changed (i.e., no write access). The read-only representation (170) may be used by the system to remove the allocation of the object by the use of local variables and scalar replacement. The allocation only needs to be reintroduced in code paths that pass the read-only representation of the object to outside the current compilation scope. The values of fields of original allocated object (175) are the values of the one or more fields of the allocated object which is in an optimized representation (i.e., the read-only representation (170) or the read-write representation (180)). The read-only representation (170) needs to be allocated in memory at most once per object allocation in the original code section. In one or more embodiments of the invention, scalar replacement may still be used with the read-only representation (170), enabling code between subroutine calls to act as if the object was local.

In one or more embodiments of the invention, the read-write representation (180) includes the token (165) and the values of fields of original allocated object (175). The read-write representation (180) includes the values of the original allocated object and, unlike the read-only representation (170), the values may be changed. The read-write representation (180) needs to be allocated at most once per object allocation in the original code section. Specifically, the read-write representation (180) allows for the allocated object to be removed by scalar replacement, although the contents of the read-write representation (180) need to be read and put into the local variables introduced by scalar replacement (this process is called "re-virtualization"), so that changes made to the values will be incorporated into the local variables.

A non-compact representation (185) includes the fields of original allocated object (190), and is globally accessible. The non-compact representation (185) is an unpacked, un-optimized (i.e., native) representation of the original object allocation with no assumptions made about the locality or type of access. The fields of original allocated object (190) are the fields of the original object allocation. It will be apparent to one of ordinary skill in the art, having the benefit of this disclosure, that there may be many different representations of objects used and, as such, the invention should not be limited to the 4 examples above. Further, for the purposes of a typing system (i.e., the collection of rules which give meaning to zeros and ones that make up a program, an example of a type is an INT, DOUBLE, or LONG, etc.), in one or more embodiments of the invention, a non-optimized representation is a read-write, read-only, and packed representation. Likewise, a read-write representation is a read-only and packed representation. Finally, a read-only representation is a packed representation.

Returning to FIG. 1A, the compiler (135) is a compiler that is communicatively connected to the interpreter (115), and includes functionality to compile a code section representation into machine code (i.e., machine code (140)). Further, the compiler (135) includes functionality to deoptimize and return execution from the compiled machine code (i.e., machine code (140)) to the interpreter (115) when a speculation about the type or locality of access to a given allocated object is wrong, or any other situation that causes a deoptimization occurs. In one or more embodiments of the invention, the compiler (135) includes machine code (140), the compact allocated object (145), and the new compact allocated object (150).

In one or more embodiments of the invention, machine code (140) is compiled code generated by the compiler (135). Machine code (140) may contain optimizations (i.e., a compact allocated object (145)) that, when found to be incorrect, cause a deoptimization out of machine code (140), at which point execution is returned to the interpreter (115). However, machine code (140) may be subsequently compiled again, resulting in a different optimization (i.e., the new compact allocated object (150)).

In one or more embodiments of the invention, a compact allocated object (145) is an optimized representation of an allocated object (i.e., a packed representation (160), a read-only representation (170), or a read-write representation (180) from FIG. 1B). The compact allocated object (145) may be based on speculation, and therefore, may deoptimize back to the interpreter (115) in response to an incorrect speculation, so that execution may continue. However, as execution continues, a second (or third, or forth, etc) speculation may be made, resulting in a new compact allocated object (150). In one or more embodiments of the invention, the new compact allocated object (150) is the same object as the compact allocated object (145), except that the new compact allocated object (150) is in a less optimized state than the compact allocated object (145). For example, if the compact allocated object (145) were a packed representation, then the new compact allocated object (150) may be a read-only or read-write representation. It will be apparent to one of ordinary skill in the art, having the benefit of this disclosure, that there are many ways for the compact allocated object (145) and the new compact allocated object (150) to be related and, as such, the invention should not be limited to the above examples.

Figure 2A:
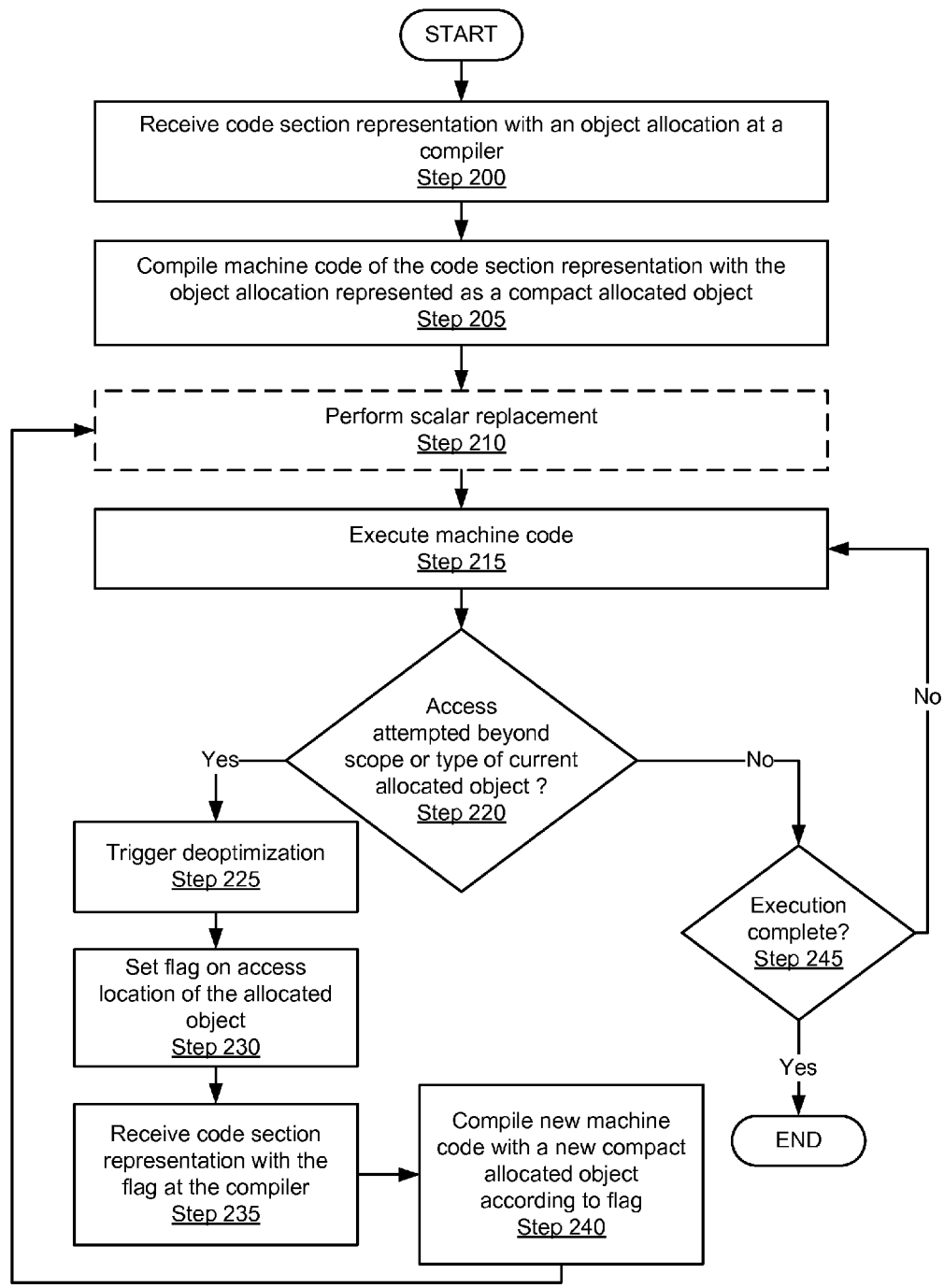
FIGS. 2A and 2B show flowcharts in accordance with one or more embodiments of the invention.
Figure 2B:
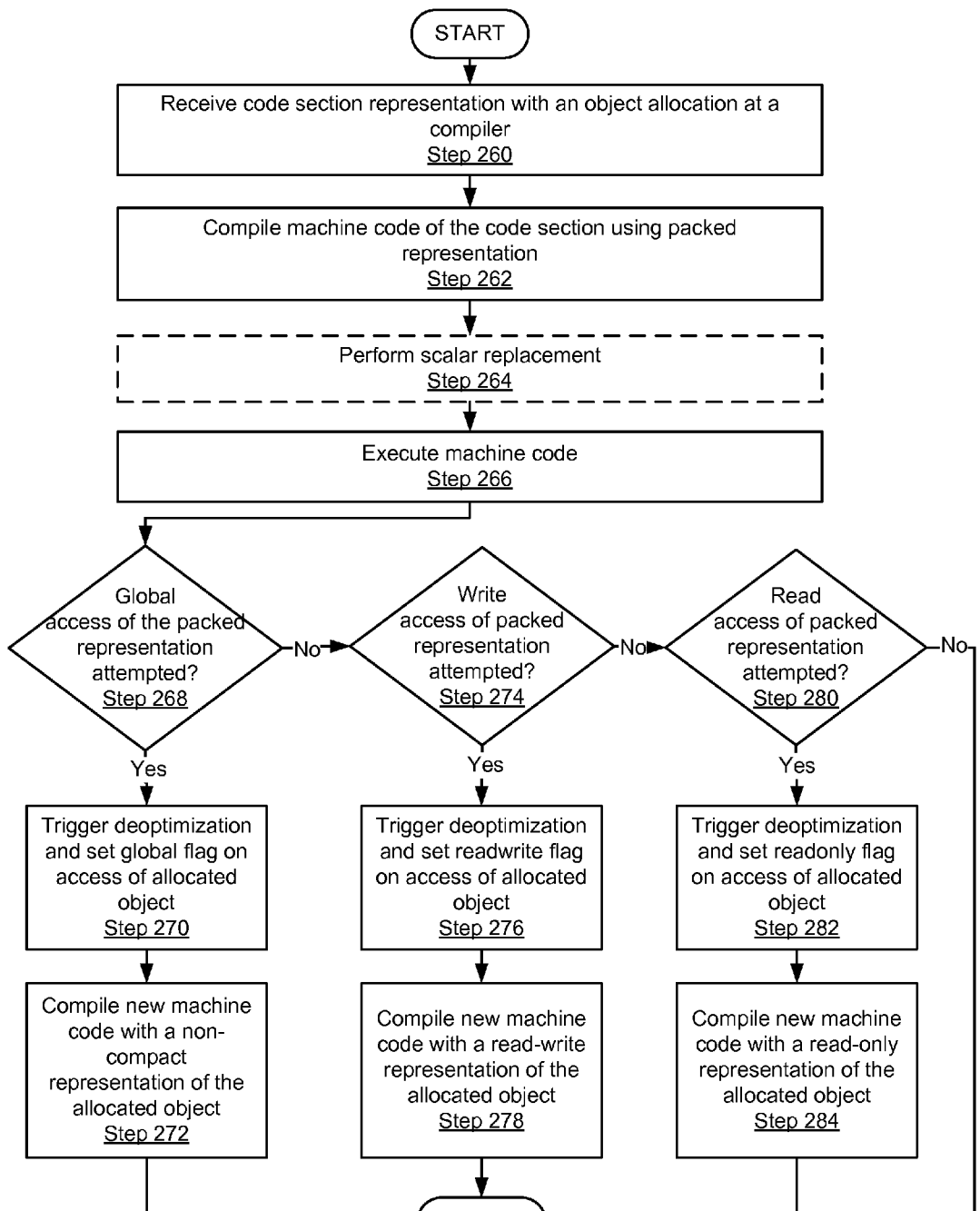

FIGS. 2A and 2B show flowcharts for speculative scalar replacement of escaping objects. While the various steps in these flowcharts are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIGS. 2A and 2B should not be construed as limiting the scope of the invention.

FIG. 2A shows a general method for optimizing code in accordance with one or more embodiments of the invention. In Step 200, a code section having an object allocation is received at a compiler, in accordance with one or more embodiments of the invention. The code section may be received from an interpreter, compiler, directly from source code, or any other suitable source in any form now known or later developed.

In Step 205, machine code of the code section representation is compiled with the object allocation represented as a compact allocated object. The machine code may be compiled in any manner now known or later developed. In one or more embodiments of the invention, the compact allocated object initially starts at the most optimistic speculation (i.e., a packed representation). Alternatively, the compact allocated object may begin at some other level of optimization. It will be apparent to one of ordinary skill in the art, having the benefit of this disclosure, that there are many levels of optimization to begin speculation at, and many ways to determine where to begin speculation and, as such, the invention should not be limited to the above examples.

In Step 210, scalar replacement is performed, in accordance with one or more embodiments of the invention. Scalar replacement may, where deemed appropriate, remove allocated objects and replace the removed allocated objects with variables local to the current compilation scope. In one or more embodiments of the invention, scalar replacement may be performed in any manner now known or later developed. Further, scalar replacement may occur simultaneously with the compilation of machine code (Step 210) or the execution thereof (Step 215). In one or more embodiments of the invention, as indicated by the dotted lines of Step 210, scalar replacement may not be performed in all instances.

In Step 215, the machine code is executed, in accordance with one or more embodiments of the invention. The machine code may be executed by a compiler, interpreter, or any other suitable component.

In Step 220, a determination is made whether access was attempted beyond the scope or type of current allocated object, in accordance with one or more embodiments of the invention. The scope is the context in which the allocated object is in effect, while the type is either read or read/write. The determination is made during runtime, and is the result of an incorrect speculation. The determination may be made in any manner now known or later developed. If there was not an access attempted that exceeded the scope or type of the current allocated object, the method proceeds to Step 245. Alternatively, if there was an attempted access from beyond the scope or type then the method proceeds to Step 225.

In Step 225, deoptimization is triggered, in accordance with one or more embodiments of the invention. The deoptimization may be triggered by an access from beyond the scope or type of the current allocated object. When the deoptimization is triggered, execution is passed from the machine code generated by the compiler to the code section representation and the interpreter.

In Step 230, a flag is set on an access location of the allocated object, in accordance with one or more embodiments of the invention. The flag may be set on the object allocation itself, on methods that call the object allocation, or at any other suitable location. In one or more embodiments of the invention, the flag is set by the interpreter. Alternatively, the flag may be set by the compiler, or by the deoptimization process. The flag may be based on the current location of execution (i.e., if the access occurred within "method A," then "method A" may receive a flag). Specifically, in one or more embodiments of the invention, the flag may be set within the code section representation so that when the code section representation is subsequently re-compiled by the compiler, the compiler will know what type of optimized representation should be used. It will be apparent to one of ordinary skill in the art, having the benefit of this disclosure, that there are many ways to indicate that a given allocated object needs a different representation and, as such, the invention should not be limited to the above example.

In Step 235, a code section representation with the flag is received at the compiler, in accordance with one or more embodiments of the invention. The code section representation may be received in any manner now known or later developed. In one or more embodiments of the invention, the code section representation is received immediately after the flag is set in Step 230. Alternatively, the code section representation may be received upon the next, or any subsequent, access of the given object allocation which had the flag set.

In Step 240, a new machine code with a new compact allocated object is compiled according to the flag, in accordance with one or more embodiments of the invention. The new machine code may be compiled in any manner now known or later developed. The new compact object allocation may be of any level of optimization. However, the new compact object representation will be less optimized than before Step 220. After Step 240, the method returns to Step 210.

In Step 245, a determination is made whether execution is complete, in accordance with one or more embodiments of the invention. The determination may be made using a method or in any manner now known or later developed. If execution is not complete, the method returns to Step 215. Alternatively, if execution is complete, the method ends.

FIG. 2B shows a more detailed method of optimizing code in accordance with one or more embodiments of the invention. While FIG. 2B shows the steps using a packed representation, one or more embodiments of the invention are not limited to starting with a packed representation, as the steps will be performed in a similar order even when a different representation is used. In such scenario, one or more embodiments may progress from a more compact representation to a less compact representation. In Step 260, a code section representation with an object allocation is received at a compiler, in accordance with one or more embodiments of the invention. The code section representation may be received in the same or similar manner as discussed in Step 200 of FIG. 2A.

In Step 262, machine code of the code section is compiled using a packed representation, in accordance with one or more embodiments of the invention. The compiler compiles the machine code, and the machine code may be compiled in the same or similar manner as discussed in Step 205 of FIG. 2A.

In Step 264, scalar replacement is performed, in accordance with one or more embodiments of the invention. In one or more embodiments of the invention, scalar replacement is able to be performed due to the representation of the object allocation. In other words, if not for the representation of the allocated object, which may be in packed, read-only, or read-write, scalar replacement may be too costly to perform. The scalar replacement may be performed in the same or similar manner as discussed in Step 210 of FIG. 2A.

In Step 266, machine code is executed, in accordance with one or more embodiments of the invention. The machine code may be executed in the same or similar manner as discussed in Step 215 of FIG. 2A.

In Step 268, a determination is made whether a global access of the packed representation was attempted, in accordance with one or more embodiments of the invention. The determination is made during runtime, and the global access may come, for example, from a method or function outside of the current compilation scope. The determination may be made in any manner now known or later developed. If there was not a global access attempt, the method proceeds to Step 274. Alternatively, if there was a global access attempt, the method proceeds to Step 270.

In Step 270, a deoptimization is triggered and a global flag is set on access of the allocated object, in accordance with one or more embodiments of the invention. The deoptimization may return execution from the compiler to the interpreter. In one or more embodiments of the invention, the interpreter sets the flag. Alternatively, the flag is set by the compiler, the deoptimization process, or any other suitable component. The global flag indicates to the compiler, when the code representation is subsequently returned to the compiler for compilation, that a non-compact representation of the allocated object is needed. The deoptimization may be performed in any manner now known or later developed.

In Step 272, new machine code is compiled with a non-compact representation of the allocated object, in accordance with one or more embodiments of the invention. The non-compact representation is able to be accessed globally within the program. The new machine code may be compiled in any manner now known or later developed. The new machine code may subsequently be executed with the non-compact representation of the allocated object.

In Step 274, a determination is made whether a write access of the packed representation was attempted, in accordance with one or more embodiments of the invention. The determination is made during runtime, and the access may come, for example, from any non-global location within the program. The determination may be made in any manner now known or later developed. If there was not a write access attempt, the method proceeds to Step 280. Alternatively, if there was a write access attempt, the method proceeds to Step 276.

In Step 276, deoptimization is triggered and a read-write flag is set on access of the allocated object, in accordance with one or more embodiments of the invention. The deoptimization may return execution from the compiler to the interpreter. In one or more embodiments of the invention, the interpreter sets the flag. Alternatively, the flag is set by the compiler, the deoptimization process, or any other suitable component. The read-write flag indicates to the compiler, when the code representation is subsequently returned to the compiler for compilation, that a read-write representation of the allocated object is needed. The deoptimization may be performed in any manner now known or later developed.

In Step 278, new machine code is compiled with a read-write representation of the allocated object in accordance with one or more embodiments of the invention. Further, in such embodiments, scalar replacement may be performed, resulting in substantial optimizations in one or more embodiments. The read-write representation is able to be read from and written to from within the current compilation scope (i.e., non-global), and may be processed by scalar replacement. Further, read and write operations are allowed in any subsequently called methods in one or more embodiments. The new machine code may be compiled in any manner now known or later developed. The new machine code may subsequently be executed with the read-write representation of the object.

In Step 280, a determination is made whether a read access of the packed representation was attempted, in accordance with one or more embodiments of the invention. The determination is made during runtime, and the access may come, for example, from any non-global location within the program. The determination may be made in any manner now known or later developed. If there was not a read access attempt, the method proceeds to end. Alternatively, if there was a read access attempt, the method proceeds to Step 282.

In Step 282, deoptimization is triggered and a read-only flag is set on access of the allocated object, in accordance with one or more embodiments of the invention. The deoptimization may return execution from the compiler to the interpreter. In one or more embodiments of the invention, the interpreter sets the flag. Alternatively, the flag is set by the compiler, the deoptimization process, or any other suitable component. The read-only flag indicates to the compiler, when the code representation is subsequently returned to the compiler for compilation, that a read-only representation of the allocated object is needed. The deoptimization may be performed in any manner now known or later developed.

In Step 284, new machine code is compiled with a read-only representation of the allocated object in accordance with one or more embodiments of the invention. Further, in such embodiments, scalar replacement may be performed, resulting in substantial optimizations in one or more embodiments. The read-only representation is able to be read from within the current compilation scope (i.e., non-global), and may be processed by scalar replacement. Further, read operations are allowed in any subsequently called methods in one or more embodiments. The new machine code may be compiled in any manner now known or later developed. The new machine code may subsequently be executed with the read-only representation of the object.

The following section describes various examples of the invention. The examples are included to aid in the understanding of the invention and are not intended to limit the scope of the invention.

FIG. 3 shows an example of optimizing code. Specifically, FIG. 3 shows pseudo code (300), which define class Foo, and subsequently create an object of class Foo, and perform various operations with or on the object. These operations occur within the method bar( ). Specifically, in line 3, obj is passed as an argument to the baz method. By passing obj as an argument, obj escapes the current compilation scope. In one or more embodiments of the invention, an optimistic assumption is made that baz will never access obj, and the system changes the representation of obj into a packed form. Subsequently, pseudo code (300) may be compiled, and, because of the packed representation of obj, scalar replacement may be performed, thereby removing the allocation of obj and replacing the allocation with local variables. Ultimately, the compiler is able to determine that bar( ) should return 7 (i.e., the value of obj.x).

If, for example, baz or a subsequent method were to attempt to read the value of a field in the packed representation of obj, the system would set a flag on bar( ) indicating that read access on obj is required. In response, the execution of bar( ) would revert from the optimized form to the non-optimized execution mode and replace the packed representation of obj with a read-only representation. Again, when bar( ) is compiled, the allocation of obj can be removed, and local variables used.

If, as another example, baz or a subsequent method were to attempt to write a value to a field of the packed or read-only representation of obj, the system would set a flag on bar( ) indicating that read/write access on obj is required. In response, the execution of bar( ) would revert from the optimized form to the non-optimized execution mode and replace the packed or read-only representation of obj with a read-write representation. Again, when bar( ) is compiled, the allocation of obj can be removed, and local variables used. However, the contents of the read-write representation need to be read and placed into the local variables so that changes made on them will be incorporated in the subsequent execution of bar( ).

As a final example, if baz or a subsequent method were to try to put the packed, read-only, or read-write representation of obj into a global state, the system would set a flag on bar( ) indicating that global access on obj is required, revert bar back to the non-optimized execution mode and replace the packed, read-only, or read-write representation with a non-optimized one. The next time bar( ) is compiled, the compiler cannot make any more optimizations based on assumptions about the locality of, or access to, obj.

Figure 4:
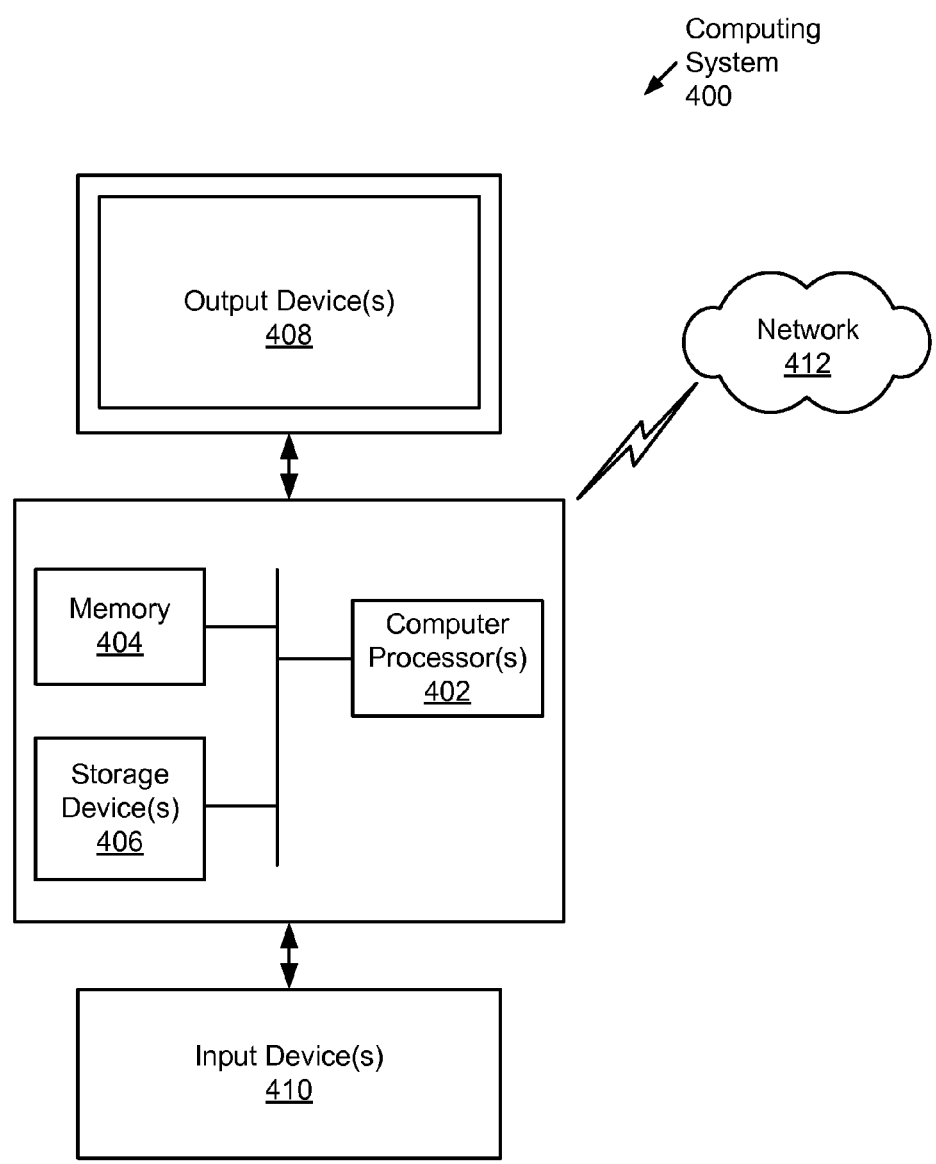
FIG. 4 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for optimizing code by progressively performing a plurality of speculations corresponding to object accesses, the method comprising:
receiving, by a compiler and from an interpreter, a code section representation comprising an object allocation for creating a non-compact allocated object;
performing a first speculation relating to a first level of access required for the non-compact allocated object;
compiling, by the compiler and based on the first speculation, the code section representation into a first machine code comprising a first compact allocated object of the object allocation, wherein the first compact allocated object occupies less space in memory than the non-compact allocated object;
encountering, during execution of the first machine code, an attempted access of the first compact allocated object that is beyond the first level of access;
triggering a deoptimization in response to the attempted access of the first compact allocated object;
returning, based on the deoptimization, from execution of the first machine code to execution of the code section representation by the interpreter;
performing, by the interpreter responsive to the triggered deoptimization, a second speculation relating to a second level of access required for the non-compact allocated object;
setting, by the interpreter, within the code section representation and based on the second speculation, a flag at a location of the attempted access, wherein the flag indicates that a second compact allocated object is required and wherein the second compact allocated object occupies more space in memory than the first compact allocated object;
receiving, by the compiler and from the interpreter, the code section representation comprising the flag;
compiling, by the compiler and according to the flag, the code section representation into a second machine code comprising the second compact allocated object; and
executing the second machine code with the second compact allocated object, wherein execution of the second machine code corresponds to the second speculation.

2. The method of claim 1, wherein the first speculation is that the first compact allocated object will not be accessed.

3. The method of claim 1, further comprising:
preparing a packed representation by generating a token for finding an origination of the packed representation,
wherein the first compact allocated object is the packed representation.

4. The method of claim 3, further comprising:
preparing, in response to the flag, a read-only representation comprising a value of one or more fields of the object allocation and the token, wherein the read-only representation prohibits writes, and
wherein the second compact allocated object is the read-only representation.

5. The method of claim 3, further comprising:
preparing, in response to the flag, a read-write representation comprising a value of one or more fields of the object allocation and the token, wherein the read-write representation allows writes, and
wherein the second compact allocated object is the read-write representation.

6. The method of claim 1, further comprising:
performing scalar replacement on the first compact allocated object.

7. A non-transitory computer-readable medium (CRM) storing a plurality of instructions for optimizing code by progressively performing a plurality of speculations corresponding to object accesses, the plurality of instructions comprising functionality to:
receive, by a compiler and from an interpreter, a code section representation comprising an object allocation for creating a non-compact allocated object;
perform a first speculation relating to a first level of access required for the non-compact allocated object;
compile, by the compiler and based on the first speculation, the code section representation into a first machine code comprising a first compact allocated object of the object allocation, wherein the first compact allocated object occupies less space in memory than the non-compact allocated object;
encounter, during execution of the first machine code, an attempted access of the first compact allocated object that is beyond the first level of access;
trigger a deoptimization in response to the attempted access of the first compact allocated object;
return, based on the deoptimization, from execution of the first machine code to execution of the code section representation by the interpreter;
perform, by the interpreter responsive to the triggered deoptimization, a second speculation relating to a second level of access required for the non-compact allocated object;
set, by the interpreter, within the code section representation and based on the second speculation, a flag at a location of the attempted access, wherein the flag indicates that a second compact allocated object is required and wherein the second compact allocated object occupies more space in memory than the first compact allocated object;
receive, by the compiler and from the interpreter, the code section representation comprising the flag;
compile, by the compiler and according to the flag, the code section representation into a second machine code comprising the second compact allocated object, wherein execution of the second machine code corresponds to the second speculation.

8. The non-transitory CRM of claim 7, wherein the first speculation is that the first compact allocated object will not be accessed.

9. The non-transitory CRM of claim 7, the instructions further comprising functionality to:
prepare a packed representation by generating a token for finding an origination of the packed representation, wherein the first compact allocated object is the packed representation.

10. The non-transitory CRM of claim 9, the instructions further comprising functionality to:
prepare, in response to the flag, a read-only representation comprising a value of one or more fields of the object allocation and the token, wherein the read-only representation does not allow writes, and wherein the second compact allocated object is the read-only representation.

11. The non-transitory CRM of claim 9, the instructions further comprising functionality to:
prepare, in response to the flag, a read-write representation comprising a value of one or more fields of the object allocation and the token, wherein the read-write representation allows writes, and wherein the second compact allocated object is the read-write representation.

12. The non-transitory CRM of claim 7, the instructions further comprising functionality to:
perform scalar replacement on the first compact allocated object.

13. A system for optimizing code by progressively performing a plurality of speculations corresponding to object accesses, the system comprising:
a processor; and
memory comprising a compiler and an interpreter executing on the processor,
wherein the compiler is configured to:
receive a code section representation comprising an object allocation for creating a non-compact allocated object,
compile, based on a first speculation relating to a first level of access required for the non-compact allocated object, the code section representation into a first machine code comprising a first compact allocated object of the object allocation, wherein the first compact allocated object occupies less space in the memory than the non-compact allocated object, trigger a deoptimization in response to the attempted access of the first compact allocated object during execution of the first machine code, wherein the attempted access is beyond the first level of access;
return, based on the deoptimization, from execution of the first machine code to execution of the code section representation by an interpreter,
receive, from the interpreter, the code section representation comprising a flag set at a location of the attempted access, wherein the flag indicates that the object allocation requires a second compact allocated object, and wherein the second compact allocated object occupies more space in the memory than the first compact allocated object; and
compile, according to the flag, the code section representation into a second machine code to generate a second compact allocated object, wherein the second machine code corresponds to the second speculation, and
wherein the interpreter is configured to:
perform, by the interpreter responsive to the triggered deoptimization, a second speculation relating to a second level of access required for the non-compact allocated object;
set, within the code section representation and based on the second speculation, the flag at the location of the attempted access.

14. The system of claim 13, wherein the first speculation is that the first compact allocated object will not be accessed.

15. The system of claim 13, wherein the compiler further comprises functionality to:
prepare a packed representation by generating a token for finding an origination of the packed representation, wherein the first compact allocated object is the packed representation.

16. The system of claim 15, wherein the compiler further comprises functionality to:
prepare, in response to the flag, a read-only representation comprising a value of one or more fields of the object allocation and the token, wherein the read-only representation does not allow writes, and wherein the second compact allocated object is the read-only representation.

17. The system of claim 15, wherein the compiler further comprises functionality to:

prepare, in response to the flag, a read-write representation comprising a value of one or more fields of the object allocation and the token, wherein the read-write representation allows writes, and wherein the second compact allocated object is the read-write representation.

\* \* \* \* \*